United States Patent Office 3,567,583
Patented Mar. 2, 1971

3,567,583
FERMENTATIVE PROCESS FOR THE PRODUCTION OF ERGOCRISTINE
Anacleto Minghetti, P.zza Vesuvio 23; Celestino Spalla, Via L. Soderini 21; and Luigi Tognoli, Via Fiordalisi 10, all of Milan, Italy
No Drawing. Filed July 2, 1968, Ser. No. 741,885
Claims priority, application Italy, Nov. 10, 1967, 22,538-A/67
Int. Cl. C12b *1/08;* C12k *1/10*
U.S. Cl. 195—81                                          1 Claim

ABSTRACT OF THE DISCLOSURE

The present invention relates to a microbiological process for the production of the ergot alkaloid ergocristine employing the new microorganisms *Claviceps purpurea* F.I. S40 which also has been given the index number ATCC 20103 by the American Type Culture Collection, Rockville, Md. 20852, U.S.A.

---

Our invention relates to a new microbiological method to produce ergocristine. More particularly, our invention has as its object a microbiological process for the production of the ergot alkaloid, ergocristine, employing the new microorganisms *Claviceps purpurea* F.I. S40 (number of the strain collection of Societa Farmaceutici Italia). The microorganism has also been given the index number ATCC 20103 by the American Type Culture Collection, Rockville, Md. 20852, U.S.A., and the index number I.P.V. F–296 by the Institute of Plant Pathology at the University of Milan, Milan, Italy. At the latter institute the microorganism is readily available.

Ergocristine belongs to the group of the ergot alkaloids. It is structurally formed of D-lysergic acid, L-valine, L-proline and L-phenylalanine, which are bound to each other by amidic bonds. Ergocristine is employed as a hpyotensive substance and is usefully used in the therapy of the peripheric-vascular troubles.

The microbiological processes known in literature to prepare alkaloids belonging to the ergot group concern the production of the mixtures of such alkaloids. After extraction, therefore, the various components of the mixture must be separated.

We have found, and this is the object of our invention, that, by culturing the new microorganism *Claviceps purpurea* F.I. S40, it is possible to perpare, in good yields, the alkaloid ergocristine only. Besides the advantages in extraction and separation, this permits obtaining a highly purified alkaloid. The new strain of *Claviceps purpurea* F.I. S40 has been isolated from a sclerotium of segale cornuta collected on a rye-thorn in the valley of the Rhone (Switzerland) and shows the following characteristics.

MICROSCOPIC CHARACTERISTICS

On the usual solid cultural media, the section of a colony shows that this is constituted of a part contacting the earth which consists of rather twisted and wound hyphae, forming a mass of color changing from cream to brown, often with violet shades. From this mass, which in the culture has the aspect of a more or less thick pellicle, winding hyphae branch out, which are not or only slightly twisted and rise up in the surrounding space directly contacted with the air (aerial hyphae). The thickness of the hyphae varies from 2 to $4\mu$. In general, in the cultures of *Claviceps purpurea* F.I. S40, conidia were not formed.

In submerged culture in shaken flasks, the mycelium of young cultures (4–6 days old) consists of bundles of slightly branched hyphae, provided with septa more or less evident according to the medium. Hyphae show evident granulations inside. Sometimes hyphae have globose enlargements having a diameter which is about twice that of the hyphae. The mycelium upon aging (12–14 days old) appears irregular, fragmented with enlargements of various sizes. Conidia are not observed. Some fragments of the mycelium look like arthrospores.

MACROSCOPIC CHARACTERISTICS

The macroscopic characteristics have been observed in cultures incubated at 29° C. for 5, 10 and 20 days on slants of the media shown. The composition of the media is reported in Table 1.

TS medium: very good growth with the aspect of a very thick, folded, velvety pellicle which is first white with violet shades, then with clearly violaceous tonalities, particularly evident on the back-side of the culture. Rare cracks and small drops of flesh-colored violet exudate.

Potato glucose medium: good growth all over the surface of the slant, rather flat, peripherically whitish colored and violaceous towards the center.

Malt medium: scanty growth all over the surface of whitish color. Short woolly aspect.

Peptone-saccharose medium: abundant growth in a folded patina penetrating the medium. Whitish color. The back-side of the culture is yellow-brown with violaceous tonalities.

T2 medium: growth all over the culture with deep folds and superficial cracks. Color: from whitish to rosy with clearly violet tonalities. The back-side is violaceous.

TABLE 1

| Components | Media | | | | | |
|---|---|---|---|---|---|---|
| | TS | T2 | TSL | Potato-glucose | Malt | Peptone-saccharose |
| Glucose, g | | | | 20 | | |
| Saccharose, g | 100 | 100 | 100 | | | 300 |
| Malt extract, g | | | | | 30 | |
| Peptone, g | | | | | | 10 |
| Asparagine, g | 10 | 10 | 10 | | | |
| $KH_2PO_4$, g | 0.5 | 0.25 | 0.5 | | | 0.5 |
| $MgSO_4 \cdot 7H_2O$, g | 0.3 | 0.25 | 0.3 | | | 0.5 |
| $Ca(NO_3)_2 \cdot 4H_2O$, g | | 1 | | | | |
| $FeSO_4 \cdot 7H_2O$, mg | 7 | 20 | 7 | | | 7 |
| $ZnSO_4 \cdot 7H_2O$, mg | 6 | 15 | 6 | | | 6 |
| Yeast extract, g | 0.1 | 0.1 | 0.1 | | | |
| Aqueous potato extract [1], cc | | | | 500 | | |
| Agar, g | 18 | 18 | | 18 | 18 | 18 |
| Tap water (cc.) to— | 1,000 | 1,000 | 1,000 | 1,000 | 1,000 | 1,000 |

[1] Preparation of the aqueous potato extract: 200 g. of peeled potatoes are cut into pieces and boiled for 45 minutes in 500 cc. of tap water. It is filtered through a gauze and taken up to the original volume.

An object of our invention is a microbiological process to prepare the alkaloid ergocristine by growing the new microorganism *Claviceps purpurea* F.I. S40 in a medium containing carbon and nitrogen sources, mineral salts, and thereafter extracting the alkaloid in known manner. More particularly, according to our invention, the microorganism is developed on a liquid cultural medium under aerobic conditions in submerged culture at a temperature betwen 22° and 30° C., preferably at 24° C., for a period from 8 to 15 days. The pH varies according to the fermentation media from 4.5 to 6.5. Glucose saccharose, mannite, sorbite, glycerine, citric acid and succinic acid may be employed as carbon source. The nitrogen source may consist of asparagine, peptone, casein hydrolyzates and ammonium salts, such as sulphate and ammonium chloride and other substances of common use. In particular, the highest production of ergocristine has been obtained using saccharose or glucose as the carbon source and asparagine or glutamic acid as the nitrogen source. The mineral salts useful for the production of the alkaloid vary according to the medium employed and may contain chlorides, phosphates, sulphates of magnesium, iron, zinc, manganese and potassium.

The strain *Claviceps purpurea* F.I. S40 may be stored by lyophilization, employing as dispersing agent a liquid consisting of two thirds of a 60% sterile aqueous saccharose solution and of one third of sterile milk. The strain *Claviceps purpurea* F.I. S40 may also be stored by successive transfers on any one of the media of Table 1.

The fermentation may be carried out in Erlenmeyer flasks and in laboratory and industrial fermenters of various capacity. The quantity of alkaloid present in the broth is determined qualitatively by paper chromatography and quantitatively by a spectrophotometrical method in comparison with a standard of ergocristine.

The following examples are to illustrate the invention without limiting it.

Example 1

The whole content of a lyophilized flask was suspended in 0.2 cc. of sterile distilled water and distributed on the surface of a slant of peptone-saccharose medium. It was incubated at 28° C. for 7–8 days. The culture so obtained may be stored in a refrigerator at about 5° C. for a month and used at any time to inoculate other slants of the same medium. These are incubated at 28° C. for 7–8 days and in the cultures obtained are employed to inoculate 300 cc. flasks containing 50 cc. of a vegetative medium having the following composition:

saccharose—100 g.
Broth extract "Vegedor"—10 g.
$KH_2PO_4$—0.5 g.
$MgSO_4 \cdot 7H_2O$—0.3 g.
$FeSO_4 \cdot 7H_2O$—7 mg.
$ZnSO_4 \cdot 7H_2O$—6 mg.
yeast extract—0.1 g.
distilled $H_2O$ to 1000 cc.
pH 5.2 to 1000 cc.

The inoculation of the vegetative media was carried out in the following manner:

A fragment of culture was homogenized by suspension in a medium and the operation was carried out in sterile conditions. A slant serves to inoculate 10 flasks. The flasks were incubated at 24° C. on a rotary shaker at the speed of 220 rotations per minute (r.p.m.) with a stroke of 3.5 cm. After 5–6 days, the culture may be employed to inoculate the productive media. The culture is white, with edges which show a fringe-like structure and although it is rather homogenous, it shows a certain number of pellets, the edges of which show a fringe-like structure.

The TSL productive medium composed as indicated in Table 1 was placed in 300 cc. flasks with 40 cc. each flask. Each flask was inoculated with 4 cc. of the vegetative culture and incubated under the described conditions for the vegetative media. After 11 days of incubation, yields corresponding to 950 γ/cc. of the alkaloid ergocristine were obtained. The content of 200 flasks was then collected and filtered. The filtrate and the mycelium were separately extracted. The filtrate (flask) was brought to pH 9 with sodium carbonate and extracted with 6 l. of chloroform. The mycelium cake was shaken with a 50% aqueous acetone solution containing 4% of tartaric acid, filtered, and this mycelium filtrate was made alkaline to pH 9 and extracted with chloroform. The chloroform extracts of the mycelium filtrate and of the flask filtrate were combined together and extracted with a 4% aqueous solution of tartaric acid. The tartaric solution was concentrated under vacuum at 20–30° C. to ⅕ of the initial volume. It was then made alkaline to pH 9 and extracted with chloroform.

10.9 g. of a crude compound were obtained. This compound was dissolved in chloroform, passed through a column of silica gel in chloroform and eluted with a mixture of chloroform containing 3% of methanol. The eluate was evaporated to dryness and gave a residue of 8.3 g. which was dissolved in benzene at the ratio of 1:20, decolored with Darco G-60, filtered and concentrated under vacuum to about 5–8 volumes of solvent per gram of alkaloid. After standing at +5° C., the crystallized ergocristine was taken up and dried under vacuum at 45° C. The product crystallized from benzene was dissolved in 1.5 volumes of a boiling 90% aqueous methyl alcohol solution and left to crystallize for 4 hours at 0° C. The crystallized product was washed with cold methanol and dried at 100° C. under vacuum.

7.1 g. of ergocristine was obtained.

$[\alpha]_D^{20°} = -180°$ (c.=1.00 in chloroform)
$[\alpha]_D^{20°} = -108°$ (c.=1.00 in pyridine)

Example 2

The mycelia of 5 slants of the strain *Claviceps purpurea* F.I. S40, prepared as described in Example 1, were suspended in 60 cc. of water, homogenized and employed to inoculate 6 liters of TV medium, described in Example 1, contained in a 10 liter glass fermenter sterilized at 120° C. for 30 minutes. It was incubated for 6 days at 24° C. with an aeration rate corresponding to an air flow of 4 liters per minute and with a stirring of 300 r.p.m. of a 6 paddles rotary shaker. The cultures thus obtained were used to inoculate, at the ratio of 10%, 6 liters of TSL medium prepared and sterilized in another 10 liter fermenter. It was incubated at 24° C. with an aeration corresponding to an air flow of 6 liters per minute with a stirring of 380 r.p.m. of a 6 paddles shaker. After 9 days of incubation, the culture contained 920 γ/cc. of the alkaloid ergocristine.

We claim:
1. A microbiological process for the production of the ergot alkaloid ergocristine, which comprises cultivating the microorganism *Claviceps purpurea* F.I. S40 under aerobic conditions in submerged culture in a nutrient liquid medium containing a carbon source, a nitrogen source and mineral salts at a temperature of from 22° to 30° C. for a period from 8 to 15 days at a pH between 4.5 and 6.5 and isolating and purifying the alkaloid obtained.

References Cited

UNITED STATES PATENTS

| | | | |
|---|---|---|---|
| 2,809,920 | 10/1957 | Stoll et al. | 195—81 |
| 2,936,266 | 5/1960 | Windesch | 195—81 |
| 3,110,651 | 11/1963 | Kybal et al. | 195—81 |
| 3,117,917 | 1/1964 | Adams | 195—81 |
| 3,276,972 | 10/1966 | Amici et al. | 195—81 |
| 3,485,722 | 12/1969 | Amici et al. | 195—81 |

JOSEPH M. GOLIAN, Primary Examiner